United States Patent
Matsuda et al.

(10) Patent No.: US 6,853,410 B2
(45) Date of Patent: Feb. 8, 2005

(54) LIQUID CRYSTAL DISPLAY DEVICE

(75) Inventors: Masaaki Matsuda, Mobara (JP); Atsushi Nemoto, Chiba (JP)

(73) Assignees: Hitachi, Ltd., Tokyo (JP); Hitachi Device Engineering Co., Ltd., Tokyo (JP)

( * ) Notice: Subject to any disclaimer, the term of this patent is extended or adjusted under 35 U.S.C. 154(b) by 0 days.

(21) Appl. No.: 10/096,573

(22) Filed: Mar. 14, 2002

(65) Prior Publication Data

US 2002/0167626 A1 Nov. 14, 2002

(30) Foreign Application Priority Data

Apr. 11, 2001 (JP) ........................................ 2001-112079

(51) Int. Cl.⁷ ............................................ G02F 1/1335
(52) U.S. Cl. ........................... 349/67; 349/65; 349/113; 362/31; 362/26
(58) Field of Search ............................. 349/65, 61, 58, 349/67, 62, 68; 362/31, 26

(56) References Cited

U.S. PATENT DOCUMENTS

| | | | | |
|---|---|---|---|---|
| 6,016,175 A | * | 1/2000 | Kim | ............................ 349/58 |
| 6,266,108 B1 | * | 7/2001 | Bao et al. | ...................... 349/63 |
| 6,300,995 B1 | * | 10/2001 | Wakagi et al. | ............... 349/141 |
| 6,330,045 B1 | * | 12/2001 | Tanaka | ......................... 349/58 |
| 6,480,245 B1 | * | 11/2002 | Sakamoto et al. | ............ 349/59 |
| 6,493,051 B2 | * | 12/2002 | Ha et al. | ..................... 349/113 |
| 6,502,945 B2 | | 1/2003 | Kim et al. | |
| 6,533,428 B1 | * | 3/2003 | Ogo et al. | .................... 362/31 |
| 6,600,526 B2 | * | 7/2003 | Yano | ............................ 349/65 |

FOREIGN PATENT DOCUMENTS

| | | |
|---|---|---|
| JP | 08-220536 | 12/1995 |
| KR | 2002-0002887 | 6/2000 |

* cited by examiner

Primary Examiner—Tarifur R. Chowdhury
Assistant Examiner—Richard H Kim
(74) Attorney, Agent, or Firm—Reed Smith LLP; Stanley P. Fisher, Esq.; Juan Carlos A. Marquez, Esq.

(57) ABSTRACT

For preventing brightness irregularities in a display screen of a liquid crystal display device having an illumination unit disposed opposite to a liquid crystal display panel thereof, the present invention provides a reflection member which has a first surface facing an opposite side of a light source to a side surface of a light guide body in the illumination unit and a second surface covering a space at the liquid-crystal-display panel side of the light source so as to make the first and second surfaces reflect light from the light source into the light guide body.

23 Claims, 6 Drawing Sheets

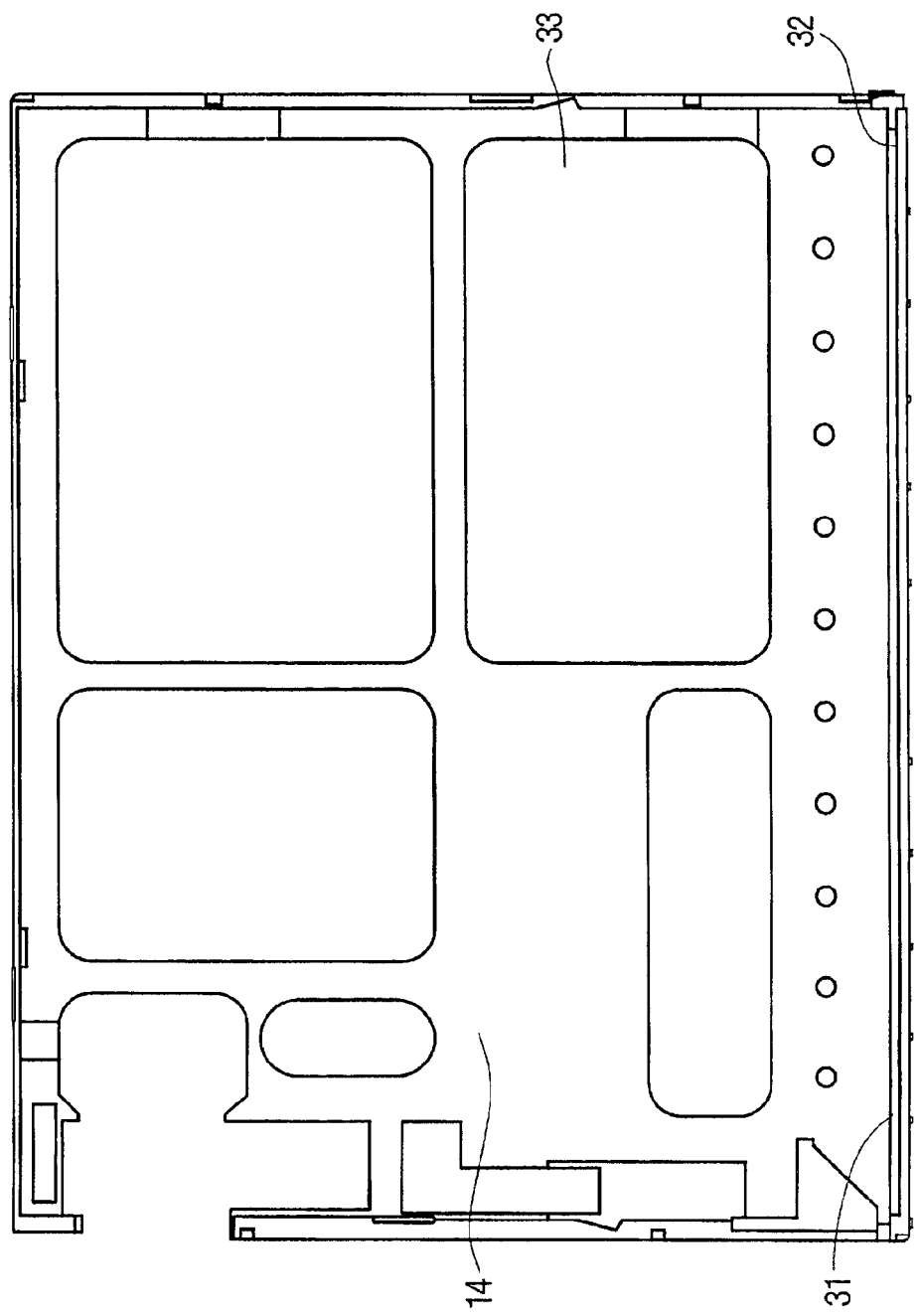

LIQUID CRYSTAL DISPLAY DEVICE

BACKGROUND OF THE INVENTION

1. Field of the Invention

The present invention relates to a liquid crystal display device, and more particularly, to a liquid crystal display device which is capable of reducing the brightness irregularities (Mura) which appear on a display screen while enhancing the brightness of the display screen.

2. Description of the Related Art

A liquid crystal display device has been widely used as a display device for personal computers, monitors, television sets and the like.

This liquid crystal display device includes a liquid crystal display panel which is comprised of a pair of substrates, a liquid crystal layer sandwiched between a pair of these substrates (a layer formed of liquid crystal composition sealed between a pair of substrates) and a group of electrodes which are formed on a main surface of at least one of a pair of substrates which faces the liquid crystal layer in an opposed manner.

In a display operation of the liquid crystal display device, an electric field applied to the inside of the liquid crystal layer by the above-mentioned group of electrodes is controlled in response to information to be displayed so as to modulate the light transmissivity of the liquid crystal layer.

Here, in the main surface of the above-mentioned substrate of the liquid crystal display panel, a region where the light transmissivity of the above-mentioned liquid crystal layer is modulated (region where the above-mentioned display operation is performed) is referred to as "effective display region".

The liquid crystal display device is roughly classified into two types, that is, an active matrix type and a passive matrix type depending on the behavior of liquid crystal molecules in the inside of the above-mentioned liquid crystal layer in the display operation and the electrode structure in the inside of the above-mentioned liquid crystal display panel which is adapted to the behavior.

The former liquid crystal display device is characterized by forming active elements in respective pixels which constitute the above-mentioned effective display region and, particularly, a product which uses thin film transistors (referred to as "TFT" (Thin Film Transistor)) as the active elements has been popularly used.

The liquid crystal display panel which uses the thin film transistors is referred to as a TFT-type liquid crystal display panel or a TFT panel.

Further, as a liquid crystal display panel which belongs to the passive matrix type, an STN (Super Twisted Nematic) type liquid crystal display has been widely used, for example.

In general, a liquid crystal display device is used in a state that the device is incorporated in a personal computer, a monitor, a television set or the like. Accordingly, the liquid crystal display device is provided as a "liquid crystal display module" in assembling steps of the personal computer, the monitor or the television set.

The liquid crystal display module is constituted of a liquid crystal display panel which arranges driver circuit parts around the panel and a backlight unit which irradiates light to the liquid crystal display panel.

For example, a TFT-type liquid crystal display module is formed such that a filter substrate on which color filters are formed and a TFT substrate on which pixel electrodes and thin film transistors (TFT) are formed are superposed to have surfaces thereof on which orientation films are formed to face each other in an opposed manner by means of sealing material formed on peripheral portions of both substrates, and liquid crystal is filled and sealed between both substrates thus forming the liquid crystal display panel.

Such a technique is described in Japanese Patent Laid-Open No. 19474/1985 and Japanese Patent Laid-Open No. 22780/1992, for example.

SUMMARY OF THE INVENTION

The above-mentioned backlight unit is roughly classified into a direct type backlight unit which arranges a cold cathode ray fluorescent lamp below a light guide body and a side-light type backlight unit which arranges a cold cathode ray fluorescent lamp at one side surface of a light guide body.

In this side-light type backlight unit, the linear cold cathode ray fluorescent lamp is arranged along the side surface of the light guide body and a reflection member is provided along the cold cathode fluorescent lamp such that the reflection member surrounds the side surface of the light guide body.

This reflection member is provided for reflecting light irradiated in the directions other than one side surface of the light guide body from the cold cathode fluorescent lamp and for making such light incident on such one side surface of the light guide body.

Due to such a constitution, a quantity of light which propagates the light guide body is increased and the intensity of light incident on the liquid crystal display panel from an upper surface of the light guide body can be increased. Accordingly, the brightness of the liquid crystal display panel for electric power supplied to the cold cathode ray fluorescent lamp can be enhanced or it is possible to maintain the brightness of the liquid crystal display panel at a level sufficient for the image display while suppressing the electric power supplied to the cold cathode ray fluorescent lamp.

On the other hand, recently, with respect to the notebook-type personal computer and the like, a tendency to enlarge a display screen and to make the computer or the like thin without changing the size of a profile of the computer or the like becomes apparent. Along with such a tendency, also with respect to a liquid crystal display module, a display region is requested to be enlarged while maintaining the computer or the like thin and without enlarging the profile size of the computer or the like.

Then, with respect to the liquid crystal display module, to enlarge the display region without enlarging the profile size of the computer or the like, it is necessary to narrow a region other than the display region (referred to as "reduction in picture frame width").

In view of such a background, in a conventional liquid crystal display module, there has been known a liquid crystal display module in which the reflection member is constituted such that one end portion of a reflection sheet which is arranged below a light guide body is extended and a periphery of a cold cathode fluorescent lamp is covered with such an extended portion. In such a case, the reflection sheet is formed of a thin synthetic resin plate or a synthetic resin sheet.

However, in the conventional structure, the reflection sheet is thermally expanded due to heat generated by the cold cathode fluorescent lamp and hence, the reflection sheet is deformed and there has been a case that the undulation is generated on the reflection sheet.

When the undulation is generated on the reflection sheet, a gap between the reflection sheet and the light guide body (a distance between the light guide body and the reflection sheet) differs between portions where the undulation is generated and other portions, whereby there has been a problem that the brightness irregularities are generated on a display screen.

The present invention has been made to solve the problems of the conventional technique and it is an object of the present invention to provide, in a liquid crystal display device, a technique which can enhance the display quality of a display screen by preventing the brightness irregularities in the display screen derived from the deformation of a reflection member which is generated due to heat generated by the light source.

The above-mentioned and other objects and novel characteristics of the present invention will be apparent based on the description of this specification and attached drawings.

To explain briefly typical inventions among the inventions disclosed in the present application, they are as follows.

To achieve the above-mentioned object, according to the present invention, in a conventional reflection sheet which is disposed below a light guide body is extended and makes an extended portion thereof surround a periphery of a light source, the improvement is characterized in that the reflection sheet is separated into two portions (a first reflection member having an inverse L-shape and a second reflection member having a planar shape of the present invention).

According to the present invention, the second reflection member which is relevant to the display quality of the display screen and is disposed below the light guide body has a planar shape and hence, even when the second reflection member receives heat generated by the light source, the elongation and shrinking of the second reflection member are facilitated whereby the undulation is hardly generated on the second reflection member.

Due to such a constitution, the present invention can prevent the generation of the brightness irregularities on the display screen so that the display quality of the display screen can be enhanced.

That is, in a liquid crystal display device comprising a liquid crystal display element having a pair of substrates and a liquid crystal layer sandwiched between a pair of substrates and an illumination unit which is disposed on a surface opposite to a display surface of the liquid crystal display element, the illumination unit includes a housing which has side walls at a periphery thereof, a light guide body which is disposed in the inside of the housing, and a light source which is disposed on a side surface of the light guide body plate in the inside of the housing, the illumination unit further includes a first reflection member which is disposed in the inside of the housing, the first reflection member includes a first side which is disposed between the light source and a side wall of the housing to face the light source in an opposed manner, the first side having a surface thereof which faces the light source in an opposed manner formed as a reflection surface, and a second side which is disposed to cover a space at a liquid-crystal-display-element side of the light source, the second side having a surface thereof which faces the light source in an opposed manner formed as a reflection surface.

In a preferred mode for carrying out the invention, the second side is arranged to close an opening portion between a side wall of the housing and the light guide body.

In a preferred mode for carrying out the invention, the first side and the second side are integrally formed.

Further, in a liquid crystal display device of the present invention comprising a liquid crystal display element having a pair of substrates and a liquid crystal layer sandwiched between a pair of the substrates and an illumination unit which is disposed on a surface opposite to a display surface of the liquid crystal display element, the illumination unit includes a housing which has side walls at a periphery thereof, a light guide body which is disposed in the inside of the housing, and a light source which is disposed between the side wall of the housing and a side surface of the light guide body plate in the housing, wherein the illumination unit further includes a first reflection member having an L-shape which is disposed in the inside of the housing, a first portion of the first reflection member which constitutes one side of the L-shape is disposed between the light source and a side wall of the housing to face the light source in an opposed manner, the first portion reflecting light from the light source so as to make the light incident on the light guide body, and a second portion of the first reflection member which constitutes the other side of the L-shape is disposed to cover a space at a liquid-crystal-display-element side of the light source, the second portion reflecting light from the light source so as to make the light incident on the light guide body.

In a preferred embodiment of the present invention, the second portion is arranged to close an opening portion between a side wall of the housing and the light guide body.

In a preferred embodiment of the present invention, the first reflection member is constituted of a synthetic resin plate.

In a preferred embodiment of the present invention, the liquid crystal display device includes a second reflection member which is disposed between the housing and the light guide body, the second reflection member having a surface thereof opposite to the light guide body formed as a reflection surface, and the second reflection member covers a side of the light guide body opposite to the liquid crystal display element and is extended to a side of the light source opposite to the liquid crystal display element.

In a preferred embodiment of the present invention, the second reflection member is arranged such that a distance is formed between an end portion of the second reflection member which is extended to a side of the light source opposite to the liquid crystal display element and a side wall of the housing, and the distance is a distance which is capable of absorbing the elongation of the second reflection member due to the thermal expansion caused by heat generated by the light source.

In a preferred embodiment of the present invention, the second reflection member is constituted of a synthetic resin plate which is formed by laminating a thin metal film to a surface opposite to the housing.

In a preferred embodiment of the present invention, the liquid crystal display device includes a second reflection member which is disposed between the housing and the light guide body and has a second surface thereof which faces the light guide body in an opposed manner formed into a reflection surface.

In a preferred embodiment of the present invention, the second reflection member is constituted of a synthetic resin plate.

In a preferred embodiment of the present invention, the second reflection member is constituted of a synthetic resin plate which is formed by laminating a thin metal film to a surface thereof which faces the light guide body in an opposed manner.

In a preferred embodiment of the present invention, the liquid crystal display device includes an upper-side case which is formed of a frame body having an opening portion which exposes a display region of the liquid crystal display element and covering a periphery of the liquid crystal display element.

BRIEF DESCRIPTION OF THE DRAWINGS

FIG. 10 is a plan view for explaining the structure of a mold of the embodiment of the present invention.

DETAILED DESCRIPTION

Embodiments of the present invention are explained hereinafter in conjunction with drawings.

In all drawings for explaining the embodiments, parts having the equal functions are given same symbols and the repeated explanation of these parts is omitted.

<<Characteristics of a TFT-type liquid crystal display module of an embodiment of the present invention>>

Figure 1:
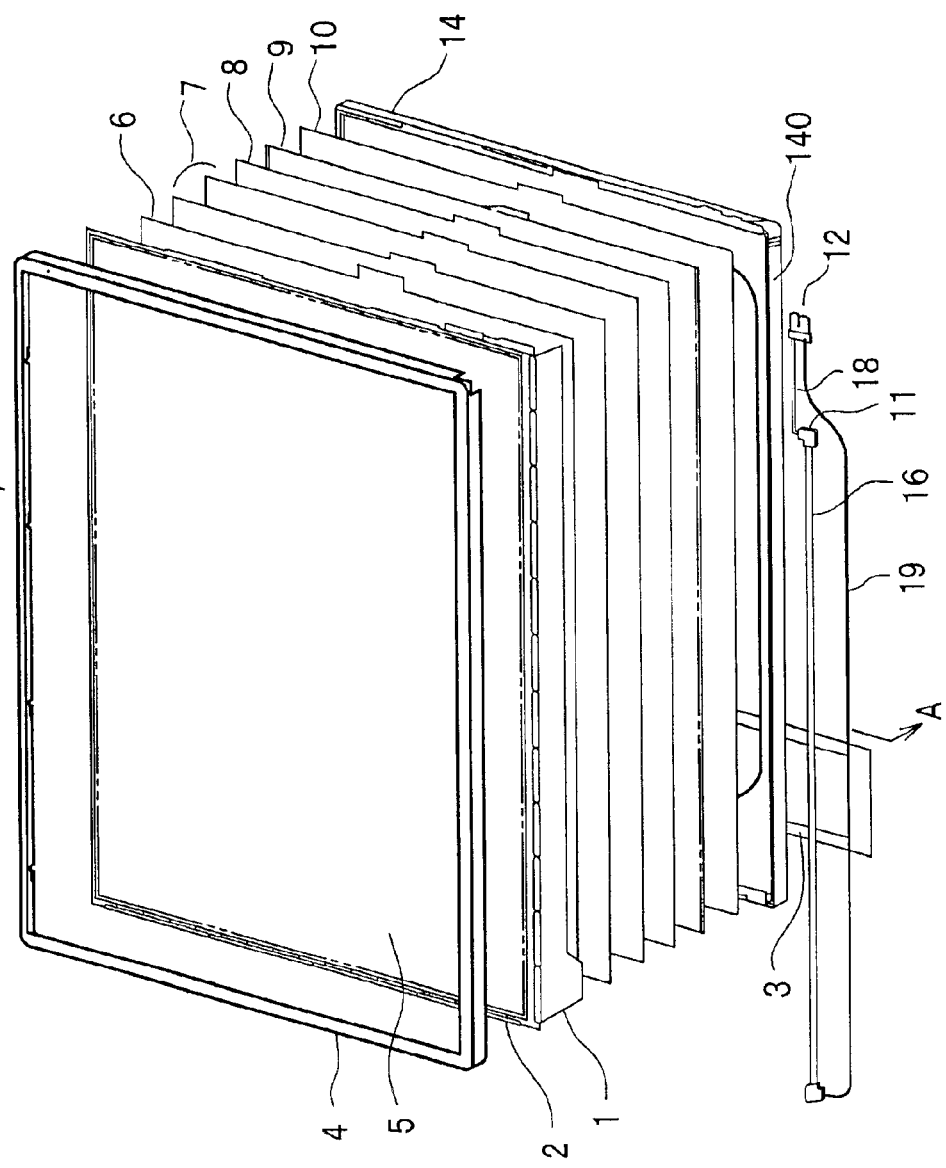
FIG. 1 is an exploded perspective view showing a schematic constitution of a liquid crystal display module (LCM) of an embodiment of the present invention.
Figure 2:
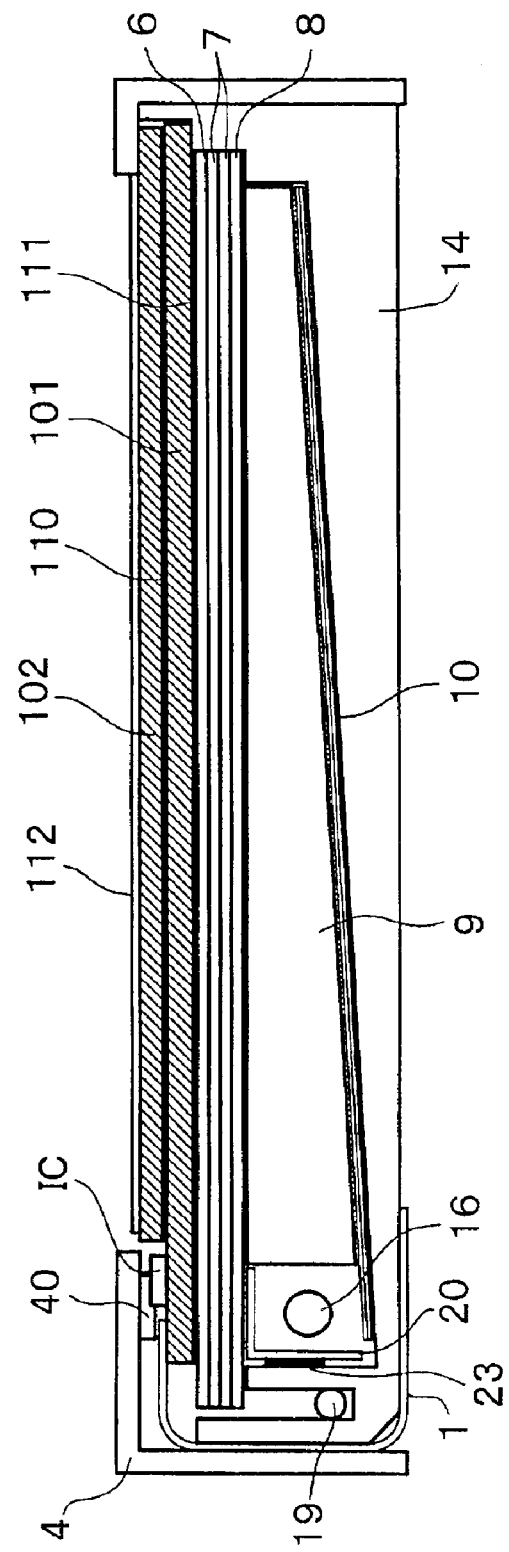
FIG. 2 is a cross-sectional view of an essential part showing the cross-sectional structure of the liquid crystal display module of an embodiment of the present invention.

FIG. 1 is an exploded perspective view showing a schematic constitution of a TFT-type liquid crystal display module (LCM) of this embodiment of the present invention and FIG. 2 is a cross-sectional view of an essential part showing a cross-sectional structure of the liquid crystal display module of this embodiment of the present invention and shows a cross-sectional structure taken along a line A—A' shown in FIG. 1.

The liquid crystal display module of this embodiment is an active matrix type liquid crystal display module which mounts driving elements (semiconductor chips) on one of substrates which constitute a liquid crystal display panel in a flip chip attachment (FCA) method. The main constituents elements are as follows.

The liquid crystal display module (LCM) of this embodiment includes a rectangular frame (upper-side case) 4 formed of a metal plate, a liquid crystal display panel (LCD: liquid crystal display element of the present invention) 5, and a backlight unit.

The liquid crystal display panel 5 is exemplified as a liquid crystal display panel 5 provided with an assembled driver circuit substrate. The liquid crystal display panel 5 includes a pair of substrates (for example, being made of material such as glass having light transmissivity and having electrical insulation ability) (101, 102) which are superposed each other while sandwiching a liquid crystal layer 110 therebetween, a plurality of groups of semiconductor integrated circuit elements for driving liquid crystal (hereinafter referred to as "driving IC") which are arranged on a periphery of one of a pair of these substrates, flexible circuit boards (1, 2) which supply signals or electric power to these driving IC from the outside of the liquid crystal display panel, and an interface circuit board 3.

Here, pixel electrodes, thin film transistors and the like are formed on the substrate 101 and which is also generally referred to as a TFT substrate, while counter electrodes, color filters and the like are formed on the substrate 102 which is also generally referred to as a filter substrate.

A pair of substrates (101, 102) are superposed each other with a given gap therebetween and both substrates are laminated to each other by means of a sealing material which is formed in a frame shape in the vicinity of a peripheral portion between both substrates. Liquid crystal is filled in a space defined in the inside of the sealing material between both substrates through a liquid crystal filling opening formed in a portion of the sealing member and is sealed. Further, polarizing plates (111, 112) are laminated to the outsides of both substrates.

A buffer member 40 is mounted on an inner wall which faces the driving ICs of the frame 4. The buffer member 40 attenuates an mechanical shock applied to the liquid crystal display panel 5 and prevents the displacement between the liquid crystal display panel 5 and the frame 4.

The flexible printed circuit boards (1, 2) are connected to an interface circuit board (including integrated circuit elements such as timing converters or the like) 3 mounted on a lower surface of the mold 14.

In the active-matrix type liquid crystal display device, a group of gate driving ICs (also referred to as "scanning signal driving ICs") of the above-mentioned driving ICs are mounted on at least one of one set of opposing sides of one of the pair of substrates, while a group of drain driving ICs (also referred to as "video signal driving ICs") thereof are mounted on at least one of the other set of sides extending in the direction which intersects the one set of sides.

In the passive-matrix type liquid crystal display device, although one of the group of gate driving ICs and the group of drain driving ICs is replaced with a group of segment driving ICs and the other group is replaced with a group of common driving ICs, no substantial difference is observed between them in appearance.

In this embodiment, the flexible printed circuit board 1 is used for the drain driving ICs and the flexible printed circuit board 2 is used for the gate driving ICs.

Over an upper side of the assembled liquid crystal display panel 5, the frame 4 (also referred to as "shield case", "upper case" or "metal case") made of a metal plate is mounted such that a display window exposes a main surface corresponding to an effective display region of the liquid crystal display panel 5. Accordingly, the frame 4 has a frame-like planar structure.

Further, the upper side of the assembled liquid crystal display panel 5 is covered with a housing (not shown in the drawing) of a personal computer or the like having a display window, for example.

To explain the above case by taking the personal computer as an example, a user of the computer looks at the liquid crystal display panel 5 shown in FIG. 1 from the upper surface side and recognizes an image displayed on the effective display region.

In FIG. 1, over a lower side of the assembled liquid crystal display panel 5, a group of optical sheets (an upper diffusion plate 6, two sheets of prism sheets 7 and a lower diffusion plate 8) are disposed by way of rubber cushions (not shown in the drawing), for example.

As shown in FIG. 1 and FIG. 2, the group of optical sheets are laminated such that the upper diffusion plate 6 and the lower diffusion plate 8 are disposed on upper and lower sides of two prism sheets.

The group of optical sheets have one ends thereof fixed to a side wall 140 formed on a periphery of a mold (also referred to as "a lower case") 14 by means of a protrusion portion.

A light guide body 9 is housed in the mold 14 such that an upper surface of the light guide body 9 faces a lower surface of the lower diffusion plate 8 in an opposed manner and a reflection sheet 10 is disposed on a lower side of the light guide body 9.

The mold 14 is formed by an integral molding using white synthetic resin or the like in many cases and a cold cathode fluorescent lamp 16 and lamp cables (18, 19) are fixed to the mold 14 by a rubber bushing 11.

The lamp cables (18, 19) are provided with connection connectors 12 for connection with an inverter circuit (not shown in the drawing) at respective ends thereof so as to supply electric power from the inverter circuit which is mounted on a lower surface of the mold 14 to the cold cathode fluorescent lamp 16.

The layout of the mold 14 is designed such that when a cold cathode ray tube is used as the cold cathode fluorescent lamp 16, the lamp cable 18 which is connected to a high-voltage-side electrode is made shorter than the lamp cable 19 which is connected to a low-voltage-side electrode whereby the fluctuation and the loss of electric power can be suppressed.

A cable guiding groove is formed in the side wall 140 of the mold 14 and the lamp cable 19 which is connected to the low-voltage side electrode of the cold cathode fluorescent lamp 16 is accommodated in the groove.

In this manner, the backlight unit of the liquid crystal display module of this embodiment is configured such that the cold cathode fluorescent lamp 16, the wedge-shaped (having a trapezoidal side shape) light guide body 9, the diffusion plates (6, 8), the prism sheet 7 and the reflection sheet 10 are fitted in the mold 14 having a side wall and formed in a frame shape in the order shown in FIG. 1.

The liquid crystal display module is completed by sandwiching and fixing the assembled liquid crystal display panel 5 between the frame 4 and the backlight unit.

The liquid crystal display module of this embodiment is configured such that the liquid crystal display panel 5 on which a plurality of drain drivers and gate drivers are mounted is housed between the frame 4 having a display window and the backlight unit.

Here, the region of the display window of the frame 4 constitutes a display region of the liquid crystal display module (LCM) and a region other than this display region, that is, a region in the periphery of the display window of the frame 4 is usually referred to as a picture frame.

Although the configuration in which the frame 4 is arranged over the assembled liquid crystal display panel 5 and the backlight unit is arranged below the assembled liquid crystal display panel 5 to facilitate the explanation, any arrangement of the frame 4 and the backlight unit is applicable so long as the condition that the frame 4 and the backlight unit face each other in an opposed manner by way of one main surface of a pair of substrates which constitute the assembled liquid crystal display panel 5 is satisfied.

<<Characteristics of TFT type liquid crystal display module of the embodiment of the present invention>>

Figure 3:
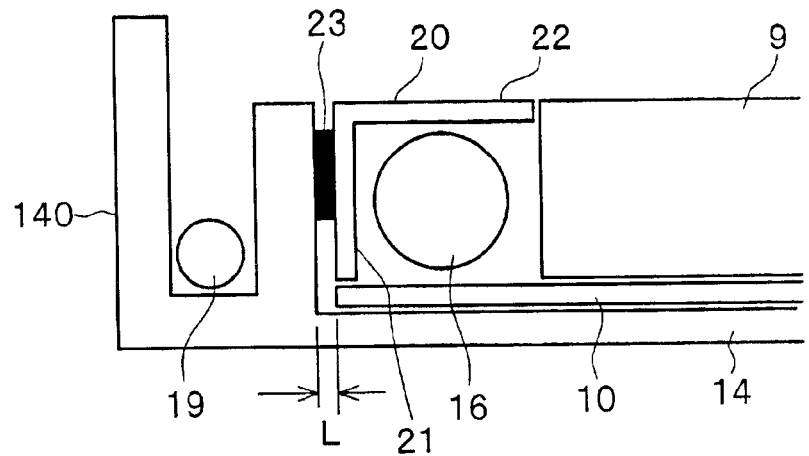
FIG. 3 is a cross-sectional view of an essential part showing the cross-sectional structure of an end portion of the liquid crystal display module of an embodiment of the present invention and is a view showing a portion of the cold cathode fluorescent lamp shown in FIG. 2 by taking out such a portion.

FIG. 3 is a cross-sectional view of an essential part showing the cross-sectional structure of an end portion of the liquid crystal display panel of the embodiment of the present invention and is a view taken out from FIG. 2 showing a portion of the cold cathode fluorescent lamp 16 in an enlarged form.

As shown in FIG. 3, in this embodiment, a lamp reflection sheet 20 having an L-shape is arranged around the cold cathode fluorescent lamp 16.

This lamp reflection sheet 20 having an L-shape is arranged along the extension direction of the cold cathode fluorescent lamp 16, wherein one side 21 of the L-shape in a cross-sectional shape is adhered to the side wall 140 of the mold 14 by a pressure sensitive adhesive double coated tape (or an adhesive agent) 23 so that the lamp reflection sheet 20 is fixed in the inside of the mold.

Here, the lamp reflection sheet 20 having an L-shape is formed by bending a sheet made of material which is as same as or similar to the material of the reflection sheet 10 in an L-shape. Between one side 21 and the other side 22 of the L-shape, a cut or the like is formed in the bent portion to suppress the curvature of a surface which faces the cold cathode fluorescent lamp 16.

Further, one side 21 of the L-shape is disposed between the cold cathode fluorescent lamp 16 and the side wall 140 of the mold 14. That is, this one side 21 faces the cold cathode fluorescent lamp 16 in an opposed manner and the surface which faces the cold cathode fluorescent lamp 16 in an opposed manner functions as a reflection surface so as to reflect light irradiated in the directions other than the side wall of the light guide body 9 from the cold cathode fluorescent lamp 16 and to make the light incident on the side surface of the light guide body 9.

Further, the other side 22 of the L-shape is arranged to cover a liquid crystal display panel side space of the cold cathode fluorescent lamp 16. That is, the other side 22 of the L-shape is arranged to close an opening portion defined between the side wall 140 of the mold 14 and the light guide body 9 and, at the same time, the surface which faces the cold cathode fluorescent lamp 16 in an opposed manner functions as a reflection surface so as to reflect light irradiated in the directions other than the side wall of the light guide body 9 from the cold cathode fluorescent lamp 16 and to make the light incident on the side surface of the light guide body 9.

Due to such a constitution, a quantity of light which propagates the light guide body 9 is increased and the intensity of light incident on the liquid crystal display panel 5 from the upper surface of the light guide body 9 can be increased so that the brightness of the liquid crystal display panel 5 with respect to electric power supplied to the cold cathode fluorescent lamp 16 is enhanced or the brightness of the liquid crystal display panel can be maintained at a level which sufficiently ensures the image display while suppressing electric power supplied to the cold cathode fluorescent lamp 16.

Prior to the explanation of advantageous effects brought about by the lamp reflection sheet 20 of this embodiment, a conventional lamp reflection sheet is explained.

Figure 8A:
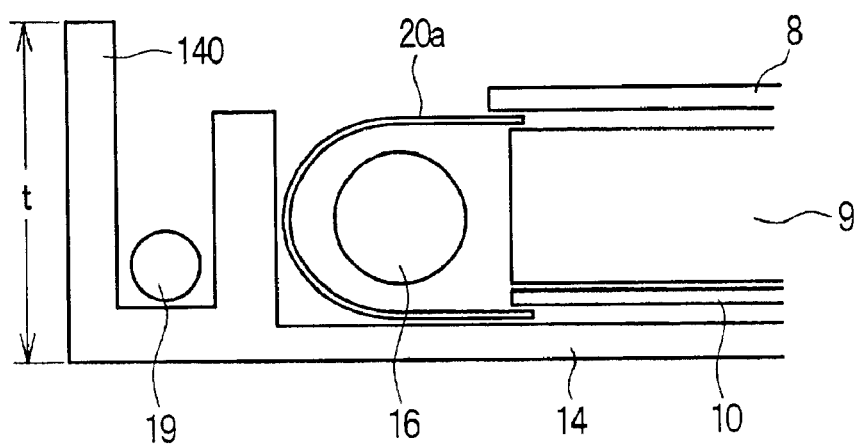
FIGS. 8A and 8B are views for explaining examples of conventional lamp reflection sheets and each of FIGS. 8A and 8B shows the cross-sectional structure of the same portion shown in FIG. 3.
Figure 8B:
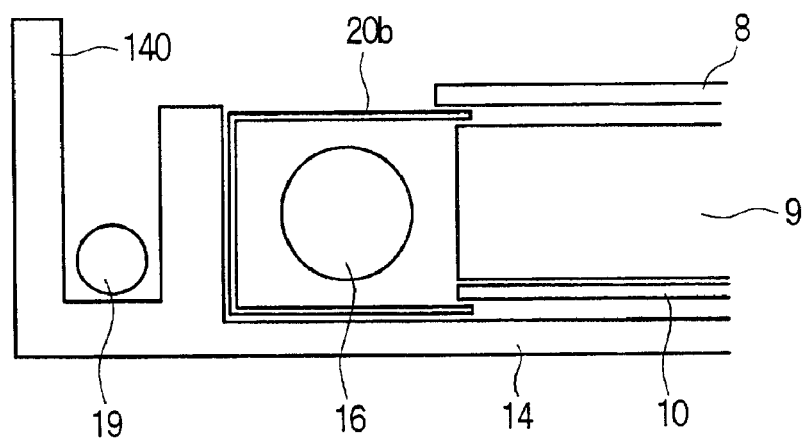

FIGS. 8A and 8B are views for explaining examples of the conventional lamp reflection sheets 20 and each of FIGS. 8A and 8B shows a cross-sectional structure of a part identical to the part shown in FIG. 3.

In the structure shown in FIG. 8A, a lamp reflection sheet 20a having a U-shaped cross section is provided along an outer periphery of the cold cathode fluorescent lamp 16 such that the lamp reflection sheet 20a surrounds a side surface of one end of the light guide body 9.

Further, in the structure shown in FIG. 8B, a lamp reflection sheet 20b having a square U-shaped cross section is provided along the outer periphery of the cold cathode fluorescent lamp 16 such that the lamp reflection sheet 20b surrounds a side surface of one end of the light guide body 9.

Also in these structures, due to the provision of the lamp reflection sheets (20a, 20b), the light irradiated in the directions other than one end surface of the light guide body 9 from the cold cathode fluorescent lamp 16 is reflected and is made incident on one end surface of the light guide body 9.

These structures are described in Japanese Patent Laid-Open No. 161119/1998, Japanese Patent Laid-Open No. 24074/1999 or Japanese Patent Laid-Open No. 176222/1999.

As mentioned previously, recently, the product such as the personal computer which is incorporated into the liquid crystal display device has been requested to make the liquid crystal display device thin and to narrow a picture frame of the liquid crystal display device.

To satisfy the former request, it is necessary to decrease a thickness of the liquid crystal display module. The thickness of the liquid crystal display module is a size in a thickness direction of a pair of substrates (101, 102) which constitute the liquid crystal display panel 5 and is indicated as "t" in FIG. 8A.

With respect to this request, the constitution of the liquid crystal display module shown in each of FIGS. 8A and 8B has a problem with respect to the fixing of the lamp reflection sheets (20a, 20b) at one end surface side of the light guide body 9.

That is, the structures shown in FIGS. 8A and 8B are configured such that one of U-shaped end portions of the lamp reflection sheet 20a or one of square U-shaped end portions of the lamp reflection sheet 20b is inserted between the reflection sheet 10 and the bottom surface of the mold 14 and is clamped by the weight of the light guide body 9 and the other end of the lamp reflection sheet 20a is extended above an upper surface of the light guide body 9 and is restricted by a group of optical sheets such as the diffusion plate 8 and the liquid crystal display panel 5.

However, in such structures, the lamp reflection sheet (20a, 20b) is superposed on an upper side and a lower side of the light guide body 9 and hence, the thickness (t) of the whole liquid crystal display module is increased due to the superposition and a gap is generated between a lower surface of the diffusion plate 8 and an upper surface of the light guide body 9 so that a foreign material enters the gap whereby an image displayed on the liquid crystal display panel 5 is degraded.

To eliminate this gap, it may be possible to absorb a step formed between the other of end portions of the lamp reflection sheet (20a, 20b) and the upper surface of the light guide body 9 on which the lamp reflection sheet (20a, 20b) is superposed by means of the diffusion plate (6, 8) and the prism sheet 7. However, there has been a problem that the irregularities (Mura) is generated in an effective display region of the liquid crystal display panel 5 due to an undulation generated on the surface of the sheet.

Figure 9:
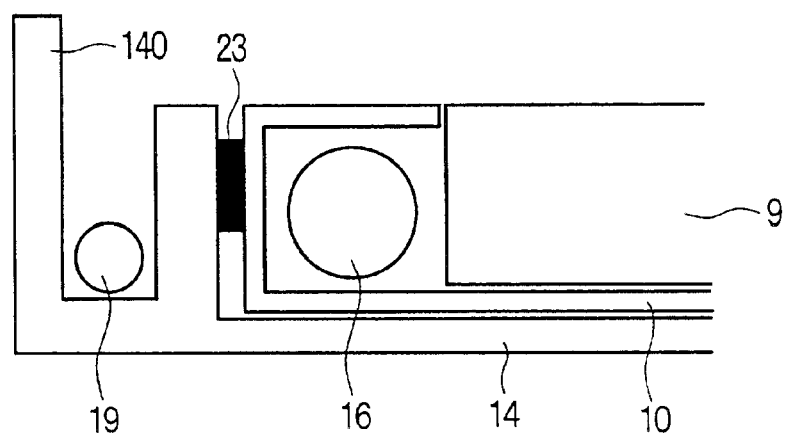
FIG. 9 is a view for explaining another example of a conventional lamp reflection sheet and is a view showing the cross-sectional structure of the same portion shown in FIG. 3.

The structure shown in FIG. 9 is developed to solve these problems.

In the structure shown in FIG. 9, one end portion of the reflection sheet 10 is extended and an outer periphery of the cold cathode fluorescent lamp 16 is covered with this extended portion.

That is, the reflection sheet 10 is constituted of a first surface which is extended from a lower surface (a surface opposite to the liquid crystal display panel 5) of the light guide body 9 to a lower side of the cold cathode fluorescent lamp 16 disposed at one end of the light guide body 9 and a second surface having a square U-shape which surrounds the cold cathode fluorescent lamp 16.

Also in the structure shown in FIG. 9, the light irradiated in the directions other than one end surface of the light guide body 9 from the cold cathode fluorescent lamp 16 is reflected on the second surface having a square U-shape of the lamp reflection sheet 10 and the light is made to incident on one end surface of the light guide body 9.

Further, in this structure, the reflection surface exhibits the apparently small curvature compared to the above-mentioned structure shown in FIG. 8A. In other words, the ratio of a flat surface which occupies the reflection surface is high compared to the ratio of a curved surface which occupies the reflection surface.

Accordingly, in the structure shown in FIG. 9, although the light irradiated in the direction other than one end surface of the light guide body 9 from the cold cathode fluorescent lamp 16 repeats the reflection several times before the light is incident on this one end surface, there is a small probability that the light is incident on the cold cathode fluorescent lamp 16 and is absorbed by the cold cathode fluorescent lamp 16 before the light is incident on one end surface of the light guide body 9.

Accordingly, it is possible to make the light irradiated in the directions other than one end surface of the light guide body 9 from the cold cathode fluorescent lamp 16 efficiently incident on the light guide body 9.

Further, by fixing the reflection sheet 10 to a surface of a periphery of the diffusion plate 8 extending on the upper portion of the cold cathode fluorescent lamp 16 which faces the cold cathode fluorescent lamp 16, a gap between the lower surface of the diffusion plate 8 and the upper surface of the above-mentioned light guide body 9 can be substantially eliminated so that this embodiment can satisfy the above-mentioned demand for making the liquid crystal display module thin.

In the structure shown in FIG. 9, although the reflection sheet 10 is formed of a synthetic resin film (or a synthetic resin sheet) as will be described later, this synthetic resin film is thermally expanded when heat is applied.

Accordingly, when the heat generated by the cold cathode fluorescent lamp 16 is applied to the reflection sheet 10 in the structure shown in FIG. 9, although the reflection sheet 10 tends to be elongated or extended, the refection sheet 10 cannot be elongated since the bent portion of the reflection sheet 10 is brought into close contact with the side wall 140 of the mold 14.

Accordingly, the reflection sheet 10 is expanded such that the reflection sheet 10 is projected from opening portions 33 formed on a bottom surface of the mold 14 shown in FIG. 10.

Here, FIG. 10 is a plan view for explaining the mold 14. In FIG. 10, numeral 33 indicates the opening portions formed in the bottom surface of the mold 14 for decreasing the weight of the mold 14 and numeral 31 indicates a region where the cold cathode fluorescent lamp 16 is arranged and numeral 32 indicates a region where a guiding groove for a cable 19 is formed.

Figure 11:
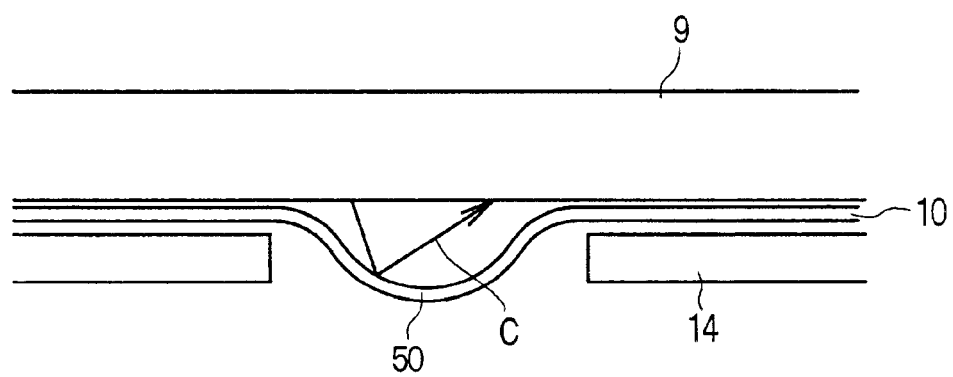
FIG. 11 is a view for explaining a problem of the conventional liquid crystal display module.

Then, although the reflection sheet 10 repeats an elongation and shrinking thereof each time the cold cathode fluorescent lamp 16 is turned on or off, due to such a repetition, there has been a case that the reflection sheet 10 is deformed and the undulation 50 is generated on the reflection sheet 10 as shown in FIG. 11.

As a result, as shown in FIG. 11, the distance between the light guide body 9 and the reflection sheet 10 becomes different locally and hence, a path of light (for example, the arrow C in FIG. 11) which is irradiated to the reflection sheet side from the light guide body 9 and is made to be incident on the light guide body 9 after being reflected on the reflection sheet 10 becomes locally different whereby there has been a problem that this induces the irregularities of brightness of the display screen of the liquid crystal display panel 5.

Here, FIG. 11 shows the undulation 50 generated on the reflection sheet 10 in an exaggerative manner to facilitate the understanding of the conventional problem.

Further, in the above-mentioned explanation, one end of the reflection sheet 10 which is disposed opposite to the bent portion is set free and hence, it may be considered that the reflection sheet 10 can be extended and shrunken. However, the portion to which the heat generated by the cold cathode fluorescent lamp 16 is applied is mainly a portion which is disposed close to the cold cathode fluorescent lamp 16 and hence, the heat generated by the cold cathode fluorescent lamp 16 is hardly applied to one end disposed opposite to the bent portion of the reflection sheet 10 whereby there arises the above-mentioned problem.

To the contrary, in this embodiment, in the structure shown in FIG. 9, to solve the above-mentioned problem, the reflection sheet 10 is separated into two portions, that is, the reflection sheet 10 which is disposed below the light guide body 9 and the lamp reflection sheet 20 having an L-shape which covers an outer periphery of the cold cathode fluorescent lamp 16.

As shown in FIG. 3, in this embodiment, a given distance (indicated by L in FIG. 3) is formed between the side wall 140 of the mold 14 and the end portion of the reflection sheet 10.

Accordingly, even when the heat irradiated from the cold cathode fluorescent lamp 16 is applied to the portion of the reflection sheet 10 disposed close to the cold cathode fluorescent lamp 16, the reflection sheet 10 can be elongated toward the side wall 140 of the mold 14 so that it is possible to prevent the generation of the above-mentioned undulation on the reflection sheet 10.

Accordingly, it is necessary to set the above-mentioned given distance (L) to a distance which can absorb the elongation of the reflection sheet 10 due to the thermal expansion which takes place due to the heat generated by the cold cathode fluorescent lamp 16.

In this manner, according to this embodiment, since the reflection sheet 10 disposed below the light guide body 9 which is relevant to the display quality of images displayed on the liquid crystal display panel 5 is formed in a planar shape, the elongation and shrinking of the reflection sheet 10 due to the thermal hysteresis of the heat applied from the cold cathode fluorescent lamp 16 is facilitated so that a phenomenon that the prior art reflection sheet is deformed and the undulation is generated on the prior art reflection sheet is hardly generated on the reflection sheet 10 of the invention.

Accordingly, it is possible to prevent the generation of the display irregularities (Mura) on the display screen of the liquid crystal display panel 5.

Figure 4:
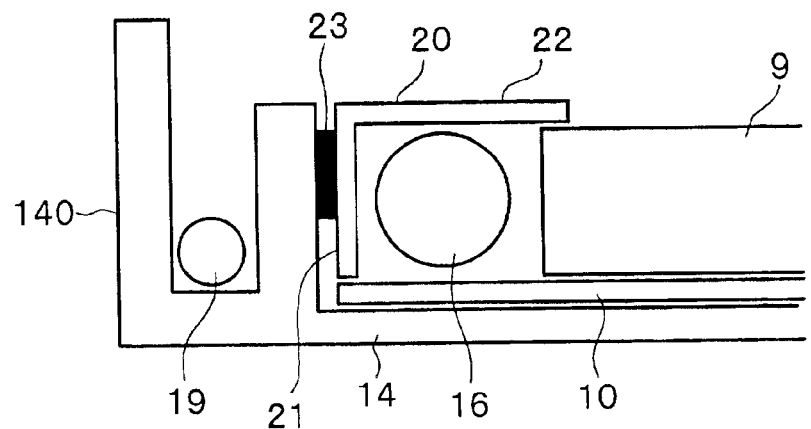
FIG. 4 is a view for explaining a modification of the liquid crystal display module of the embodiment of the present invention and is a cross-sectional view of an essential part showing the cross-sectional structure of the same part shown in FIG. 3.

FIG. 4 is a view for explaining a modification of the liquid crystal display module of this embodiment and also is a cross-sectional view of an essential part showing the cross-sectional structure of a portion equal to that of FIG. 3.

In an example shown in FIG. 4, the other side 22 of the lamp reflection sheet 20 having an L-shape is extended such that an end portion of the other side 22 is superposed on the light guide body 9.

Due to such a structure, although it is possible to prevent the leaking of light through a gap defined between the end portion of the other side 22 of the lamp reflection sheet 20 having an L-shape and the light guide body 9, the structure has a defect that the thickness of the superposed portion becomes thick.

However, when there is no problem in making the thickness of the liquid crystal display module thick, this structure is preferable.

Figure 5:
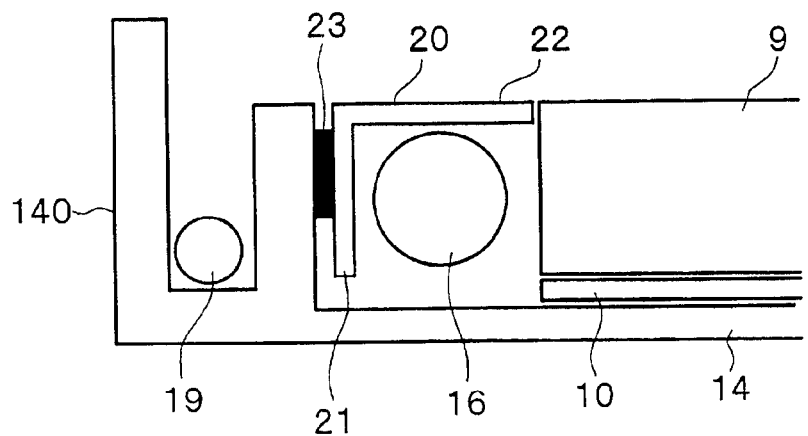
FIG. 5 is a view for explaining another modification of the liquid crystal display module of the embodiment of the present invention and is a cross-sectional view of an essential part showing the cross-sectional structure of the same part shown in FIG. 3.

FIG. 5 is a view for explaining another modification of the liquid crystal display module of this embodiment and also is a cross-sectional view of an essential part showing the cross-sectional structure of a portion equal to that of FIG. 3.

In the example shown in FIG. 5, the reflection sheet 10 is not extended to the lower side of the cold cathode fluorescent lamp 16 and the size of the reflection sheet 10 is set substantially equal to the size of the light guide body 9.

In this embodiment, by making use of the fact that the mold 14 is generally formed of white synthetic resin, light irradiated downwardly from the cold cathode fluorescent lamp 16 is made to be reflected on the mold 14. It is also possible to obtain the above-mentioned advantageous effects with such a structure.

Further, although the case in which the lamp reflection sheet 20 having an L-shape is formed as an integral body is explained in the above-mentioned embodiment, provided that the advantageous effects of the present invention is not damaged, it is also possible to form the lamp reflection sheet 20 having an L-shape by using parts separate from each other.

That is, it may be possible that one side 21 and the other side 22 which constitute the L-shape in FIG. 3 are separately formed and these sides 21, 22 are assembled to form the lamp reflection sheet 20 having an L-shape.

Subsequently, material of the lamp reflection sheet 20 of this embodiment is explained.

The lamp reflection sheet 20 of this embodiment is constituted of a plate-like member which is formed, in the same manner as the conventional reflection sheet 10, by dispersing white pigment in resin such as polyethylene terephthalate (PET), polycarbonate, polymethylmethacrylate, polyester, polystyrene, polyvinyl chloride or the like.

Alternatively, the lamp reflection sheet 20 of this embodiment is constituted of a plate-like member which is formed by forming a metal film made of aluminum, silver or the like on resin such as polyethylene terephthalate (PET), polycarbonate, polymethylmethacrylate, polyester, polystyrene, polyvinyl chloride or the like by vapor deposition.

Here, from a viewpoint of making the liquid crystal display module thin or from a viewpoint of forming the lamp reflection sheet 20 in an L-shape, it is preferable to select the lamp reflection sheet 20 made of material which can realize the hardness similar to that of cardboard, for example, without increasing the thickness and, it is also preferable to select the lamp reflection sheet 20 made of material which has a suitable hardness sufficient to prevent the deflection of the the lamp reflection sheet 20 on the cold cathode fluorescent lamp 16.

From these points of view, polyethylene terephthalate resin or polycarbonate resins are recommended as material used for forming the lamp reflection sheet 20.

Subsequently, the material of the reflection sheet 10 of this embodiment is explained.

The reflection sheet 10 of this embodiment is constituted of a plate-like member which is formed, in the same manner as the conventional reflection sheet 10, by dispersing white pigment in resin such as polyethylene terephthalate (PET), polycarbonate, polymethylmethacrylate, polyester, polystyrene, polyvinyl chloride or the like.

Alternatively, the reflection sheet 10 of this embodiment is constituted of a plate-like member which is formed by forming a metal film made of aluminum, silver or the like on resin such as polyethylene terephthalate (PET), polycarbonate, polymethylmethacrylate, polyester, polystyrene, polyvinyl chloride or the like by vapor deposition.

Figure 6:
FIG. 6 is a cross-sectional view showing the cross-sectional structure of one example of a reflection sheet of the embodiment of the present invention.
Figure 7:
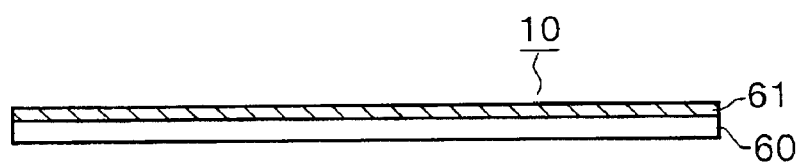
FIG. 7 is a cross-sectional view showing the cross-sectional structure of another example of a reflection sheet of the embodiment of the present invention.

FIG. 6 and FIG. 7 show the cross-sectional structures of the reflection sheet 10 having the latter constitution.

The reflection sheet 10 shown in FIG. 6 can enhance the reflectivity by forming a metal film 61 made of aluminum, silver or the like on a mold-side surface of a synthetic resin plate 60 made of the above-mentioned material by vapor deposition.

The reflection sheet 10 shown in FIG. 7 can enhance the reflectivity by forming a metal film 61 made of aluminum, silver or the like on a liquid-crystal-display-panel-side surface of a synthetic resin plate 60 made of the above-mentioned material by vapor deposition.

Here, when the reflection sheet 10 shown in FIG. 7 is used in the structure shown in FIG. 1, the high-frequency electric power leaks through the metal film 60. Accordingly, it is preferable to apply the reflection sheet shown in FIG. 7 to the structure shown in FIG. 5.

Further, although the embodiments in which the present invention is applied to the TFT-type liquid crystal module have been mainly explained in the above-mentioned embodiments, the present invention is not limited to such embodiments. It is needless to say that the present invention is applicable to a STN-type liquid crystal display module.

Although the invention made by inventors of the present invention has been specifically explained in conjunction with the above-mentioned embodiments, it is needless to say that the present invention is not limited to the above-mentioned embodiments and various modifications can be made without departing from the gist of the present invention.

To briefly explain the advantageous effects which are obtained by the typical inventions among inventions disclosed in the present application, they are as follows.

According to the liquid crystal display device of the present invention, the brightness irregularities in the display screen derived from the deformation of the reflection member due to the heat generated by the light source can be prevented so that the display quality of the display screen can be enhanced.

What is claimed is:

1. A liquid crystal display device comprising a liquid crystal display element having a pair of substrates and a liquid crystal layer sandwiched therebetween, an illumination unit which is disposed on a surface opposite to a display surface of said liquid crystal display element, said illumination unit including an integrally-molded housing which is made of white synthetic resin and has side walls at a periphery thereof, a light guide body which is disposed between the substrates and said housing, a light source which is disposed on a side surface of said light guide body in said housing, and a reflection sheet being positioned between the light guide body and said housing with a space from one end of the first reflection surface of said first reflection member so as to be thermally expandable in a direction substantially parallel with the substrates, when the light source is turned on, without generating undulation thereon, wherein said illumination unit further includes a first reflection member which is disposed in said housing, said first reflection member including:

a first plate disposed between said light source and one of the side walls of said housing to be substantially perpendicular to the pair of substrates such that a first reflection surface thereof faces said light source, said first plate being thermally expandable in a direction substantially perpendicular to the substrates, when the light source is turned on, without generating undulation thereon, a second plate disposed between said light source and the pair of substrates to be substantially parallel with the pair of substrates such that a second reflection surface thereof faces said light source, said second plate being thermally expandable in a direction substantially parallel with the substrates, when the light source is turned on, without generating undulation thereon, and said reflection sheet is further disposed between said light source and said housing without reaching said one of the side walls so as to expose a surface of said housing to said light source such that a light irradiated downwardly from said light source is reflected by a Part of said surface of said housing which is substantially parallel with the substrates.

2. A liquid crystal display device according to claim 1, wherein a surface opposite to the first reflection surface is adhered to said one of the side walls of said housing.

3. A liquid crystal display device according to claim 1, wherein said second reflection surface has an end portion thereof superposed on said light guide body.

4. A liquid crystal display device according to claim 1, wherein said second reflection surface is arranged to close an opening portion between said one of the side walls of said housing and said light guide body.

5. A liquid crystal display device according to claim 1, wherein said first reflection surface and said second reflection surface are integrally formed.

6. A liquid crystal display device according to claim 1, wherein the reflection sheet has a size at least substantially equal to the light guide body.

7. A liquid crystal display device comprising a liquid crystal display element having a pair of substrates and a liquid crystal layer sandwiched between the pair of substrates and an illumination unit which is disposed on a surface opposite to a display surface of said liquid crystal display element, said illumination unit including an integrally-molded housing which is made of white synthetic resin and has side walls at a periphery thereof, a light guide body plate which is disposed between said housing and the substrates, a light source which is disposed on a side surface of said light guide body plate in said housing, wherein said illumination unit further includes a first reflection member having an L-shape cross section which is disposed in said housing, and a second reflection member is positioned between the light guide body plate and said housing with a space from one end of the first reflection surface of said first reflection member so as to be thermally expandable in a direction substantially parallel with the substrates, when the light source is turned on, without generating undulation thereon, a first reflection surface of said first reflection member is disposed between said light source and one of the side walls of said housing to face said light source, a second reflection surface of said first reflection member between said light source and the pairs of substrate substantially parallel with the pair of substrates, and said second reflection member is further disposed between said light source and said housing without reaching said one of the side walls so as to expose a surface of said housing to said light source such that a light irradiated downwardly from said light source is reflected by a part of said surface of said housing which is substantially parallel with the substrates.

8. A liquid crystal display device according to claim 7, wherein a back surface of said first reflection surface is adhered to said one of the side walls of said housing.

9. A liquid crystal display device according to claim 7, wherein said second reflection surface has an end portion thereof superposed on said light guide body plate.

10. A liquid crystal display device according to claim 7, wherein said second reflection surface is arranged to close an opening portion between said one of the side walls of said housing and said light guide body plate.

11. A liquid crystal display device according to claim 7, wherein said first reflection member is constituted of synthetic resin.

12. A liquid crystal display device according to claim 7, wherein said second reflection member covers a side of said light guide body plate opposite to said liquid crystal display element and is extended to a side of said light source opposite to said liquid crystal display element.

13. A liquid crystal display device according to claim 12, wherein said second reflection member is constituted of a resin plate which is formed by laminating a thin metal film to a surface opposite to said housing.

14. A liquid crystal display device according to claim 12, wherein said second reflection member is constituted of synthetic resin.

15. A liquid crystal display device according to claim 14, wherein said second reflection member is constituted of a synthetic resin plate which is formed by laminating a thin metal film to a surface thereof which faces said light guide body plate in an opposed manner.

16. A liquid crystal display device according to claim 7, wherein the second reflection member has a size at least substantially equal to the light guide body plate.

17. A liquid crystal display device comprising a liquid crystal display element having a pair of substrates and a liquid crystal layer sandwiched between the pair of substrates and an illumination unit which is disposed on a surface opposite to a display surface of said liquid crystal display element, said illumination unit including an integrally-molded housing which is made of white synthetic resin and has side walls at a periphery thereof, a light guide body which is disposed between said housing and the substrates, a light source which is disposed on a side surface of said light guide body in said housing, wherein said illumination unit further includes a first reflection member having an L-shape crass section and a second reflection member, a first reflection surface of said first reflection member is disposed between said light source and one of the side walls of said housing to be substantially perpendicular to the substrates, a second reflection surface of said first reflection member is disposed between said light source and the substrates to be substantially parallel with the substrates, the second reflection member is positioned between the light guide body and said housing with a space from one end of the first reflection surface of said first reflection member so as to be thermally expandable in a direction substantially parallel with the substrates, when the light source is turned on, without generating undulation thereon, and said reflection sheet is further disposed between said light source and said housing without reaching said one of the side walls so as to expose a surface of said housing to said light source such that a light irradiated downwardly from said light source is reflected by a part of said surface of said housing which is substantially parallel with the substrates.

18. A liquid crystal display device according to claim 17, wherein said second reflection surface has an end portion thereof superposed on said light guide body.

19. A liquid crystal display device according to claim 17, wherein the second reflection member has a size at least substantially equal to the light guide body.

20. A liquid crystal display device according to claim 17, wherein said housing consists of a plate and said side walls at each periphery thereof.

21. A liquid crystal display device according to claim 17, further including at least one optical sheet disposed between said second reflection surface of said first reflection member and said substrates.

22. A liquid crystal display device according to claim 17, wherein said first reflection member is made of synthetic resin.

23. A liquid crystal display device according to claim 17, wherein said second reflection member is constituted of a resin plate which is formed by laminating a metal film to a surface opposite to said integrally molded housing.

* * * * *